Patented Apr. 28, 1942

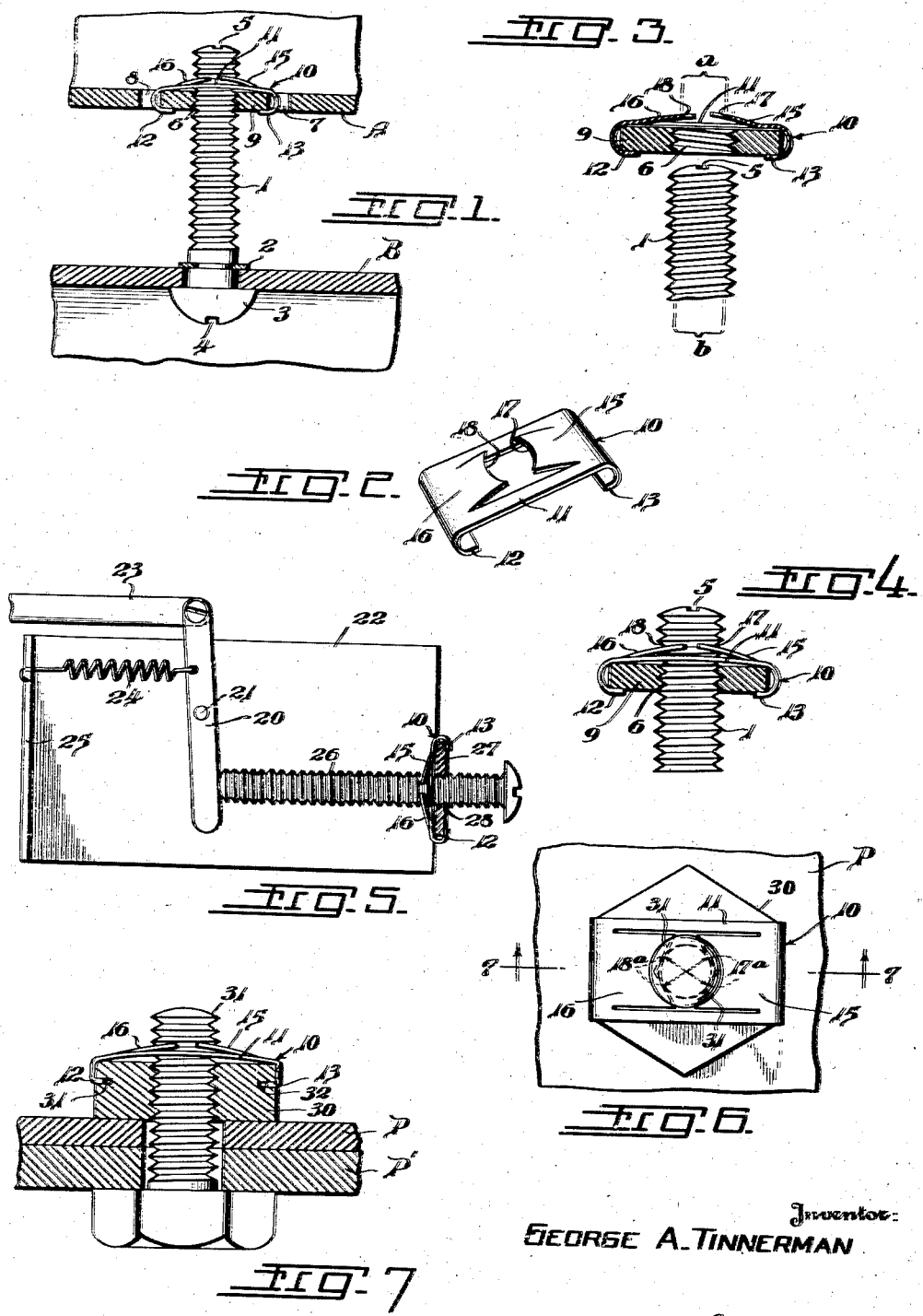

2,281,056

UNITED STATES PATENT OFFICE 2,281,056

FASTENING DEVICE

George A. Tinnerman, Cleveland, Ohio, assignor, by mesne assignments, to Tinnerman Products, Inc., Cleveland, Ohio, a corporation of Ohio Application November 27, 1939, Serial No. 306,357

7 Claims. (Cl. 151—30)

This invention relates in general to improvements in fastening devices and deals, more particularly, with the provision of an improved spring locking means of general utility for bolt or screw members, especially of the adjustable character having use, for example, as the means for determining the position to which a part shall be brought with respect to a cooperating part in an installation, or otherwise employed as a substantial stop device for arresting or limiting the motion of a movable part in an assembly.

A primary object of the present invention is for the provision of such a spring locking means embodying a simple, inexpensive form of fastening device with which a bolt or screw fastening may be employed in the relation hereinafter specified to effect a substantial locking of the bolt or screw in adjusted position against accidental turning and unintended rotation resulting from vibration and jarring effects which ordinarily would disturb the proper setting of the bolt or screw from its desired adjusted position.

Another principal object of the invention is for the provision of a spring locking means of this character which dispenses entirely with the necessity for auxiliary lock nuts, lock washers, and the like, for preventing rotation of the bolt or screw in adjusted position, and otherwise reduces to a minimum the time required not only for adjusting the same in a completed mounting but also, in the initial assembly thereof in an installation. In the ordinary arrangement for adjusting a bolt or screw stop device, for example, an inordinate amount of time is usually required for the several operations of first, loosening the lock nut; second, turning the screw to adjusted position; and third, tightening the lock nut in the adjusted position of the screw. In contrast, in an equivalent structure embodying the spring locking fastener of the present invention, the bolt or screw is held in desired adjusted position under a constant spring tension which is capable of providing the desired locking effect on the bolt shank to hold the same against movement due to any possible vibration, etc., yet permits the same to be readily turned under tool force for the necessary adjustment thereof in its mounting without change whatsoever in the position of the locking fastener or the attachment thereof to the part supporting the same.

A further object of the invention, therefore, is to provide a locking arrangement for an adjustable bolt or screw which is threadedly engaged in an aperture in a supporting part in the usual manner in conjunction with an auxiliary sheet metal locking fastener adapted to exert a constant spring force on the shank of the bolt or screw to lock the same in its applied mounted position but capable of being readily turned for easily and quickly providing any necessary adjustment thereof in such mounted position.

Another, more specific object of the invention is for the provision of such a fastening arrangement for a bolt or screw which is threadedly mounted or secured in an aperture in a part and with which the sheet metal locking fastener also is threadedly engaged to operate in the manner of a substantial spring nut to supply a continuously effective spring locking action on the bolt or screw in such threaded engagement to prevent accidental turning of the bolt in applied position and otherwise resist relative rotation thereof with respect to said part. In this relation, the invention has for a further object the use of the present fastening arrangement as a spring locking means for a coupled nut and bolt employed to secure any two or more parts in an installation, as well as a simple bolt locking means of general utility.

Further objects and advantages, and other new and useful features in the construction, arrangement and general combination of parts of the invention will be readily apparent to those skilled in the art as a description thereof proceeds with reference to the accompanying drawing in which like reference characters designate like parts thereof throughout, and in which:

Fig. 1 is a vertical sectional view of one type of assembly embodying the improved bolt locking fastening arrangement of the present invention in which the bolt is employed for securing cooperating structural parts in adjustable spaced relation;

Fig. 2 is a perspective of the spring locking fastener per se shown employed in Fig. 1;

Fig. 3 is a fragmentary sectional view showing the position of the spring locking fastener as attached to its associated supporting part preparatory to the application thereto of the bolt or screw fastening, the spring locking fastener being represented in section;

Fig. 4 is a view similar to Fig. 3 showing the bolt or screw fastening as threadedly engaged with said supporting part and the spring locking fastener to locked adjustable relation in applied mounted position;

Fig. 5 illustrates a modification embodying a substantial stop device provided by a bolt mounted in locked adjustable position in accordance with the present invention;

Figs. 6 and 7 show another embodiment in which the spring fastening arrangement of the present invention is employed as locking means for a coupled nut and bolt, Fig. 6 being a top plan of the assembly; and, Fig. 7 is a sectional view of the coupled nut and bolt assembly as taken on line 7—7 of Fig. 6 looking in the direction of the arrows, the spring locking fastener being shown in elevation.

The fastening arrangement of the present invention is one of general utility so far as concerns the provision of a positive locking action for a bolt or screw in practically any installation, and is particularly advantageous in the use of the bolt or screw as an adjustable stop device or as a means for adjustably securing a part with respect to another cooperating part in an assembly. In several more important of such uses, for example, the improved fastening arrangement is employed as a means for mounting a bolt serving as the adjustable stop in a number of well known forms of carburetor control units; in various headlamp constructions, as a means for retaining the rods or bolts supporting the reflector within the headlamp sub-body and otherwise capable of adjustment to move the reflector as may be necessary to adjust the headlamp beam; and, in certain forms of electrical coils, as a means for adjustably mounting the cores therein with no material change in the usual construction, operation and use thereof, yet at a considerable reduced cost for the provision of such adjustable fastening means. This may be readily understood when it is considered that, generally speaking, the spring locking fastener employed may be constructed from a small inexpensive section of sheet metal having preferably integral thread means for threadedly engaging the adjustable bolt under a constant spring tension which provides the desired locking action, and thereby eliminates the necessity for auxiliary lock nuts and similar locking devices for preventing accidental or unintentional turning movement of the bolt from adjusted position.

Referring now, more particularly, to Figs. 1 to 4 inclusive of the drawing, Fig. 1 illustrates one application of the invention in which an adjustable bolt 1 is employed for securing a pair of cooperating structural parts A, B, in spaced relation but capable of fine, minute adjustments to vary the relative position of such parts as may be necessary or desirable in an assembly. Thus, the bolt 1 is fixedly but rotatably secured to one of said parts B to move the same toward and from the cooperating part A carrying the spring locking fastener supplying the locking action on the bolt.

In a preferred arrangement, said bolt 1 extends through an aperture in said part B and is provided with a reduced neck portion on which a washer 2 is secured to bear on the face of said part B opposite to that engaged by the clamping surface of the bolt head 3. Said washer 2, or the like, may be of any appropriate form and be secured onto the bolt in any suitable manner to retain the bolt in assembled relation with said part B, so long as the bolt is rotatable in such assembled relation by means of a tool applied to the recess 4 in the bolt head 3 or similar tool recess 5 provided in the leading end thereof.

In the part A, the bolt 1 is threaded into a screw threaded passage 6, and on either side of said bolt passage, openings or slots 7, 8, Fig. 1, are provided to present a supporting segment or substantial bracket 9, as shown in Figs. 3 and 4, and to which the auxiliary fastening device designated generally 10, is attached to provide the spring locking action for the bolt or screw, as presently to be described.

As best seen in Fig. 2, a preferred form of the fastening device 10, is constructed from a small, inexpensive section of any suitable sheet metal, preferably spring metal or a metal having spring-like characteristics such as cold-rolled steel. The device is formed in a manner to provide a resilient base 11, the ends of which are bent inwardly to the underside thereof in the manner of substantial flanges 12, 13, suitably designed to embrace the sides of the bracket 9, Fig. 3, and otherwise maintain said base of the fastening device in substantially flat condition on said bracket 9. In this relation, said base 11 of the fastening device is provided with bolt or screw thread engaging means 15, 16, concentrically arranged with respect to the screw-threaded bolt passage 6, Fig. 3, in said bracket 9, and otherwise aligned therewith in position to threadedly engage the threads of the bolt 1 threaded in said passage 6.

Said thread engaging means 15, 16 may be pressed, stamped, extruded or otherwise provided from the base 11 in any suitable form or construction so long as the same threadedly engage with the bolt threads. In this respect, the present invention fully contemplates the provision of such thread engaging means in various other related forms as in the manner of a substantial perforated hub pressed from the sheet metal and which is shaped to provide a helical thread or otherwise tapped to provide a plurality of threads for threadedly engaging the bolt. However, it has been found that such thread engaging means 15, 16, prepared in the form of cooperating, yieldable tongues, as shown, are the most efficient and the most practical in that they are possessed of unusual inherent strength and will not collapse or pull through, nor loosen from effective locking engagement with the bolt under continuous strain and vibration in the installation in which the fastening device is employed. This takes place by reason of the fact that the sheet metal material of the spring locking fastener from which such tongues 15, 16, are formed, is of less thickness than the pitch or spacing of the threads of the bolt or screw, wherefore such tongues in moving toward each other to engage the bolt threads, cut into the grooves intermediate adjacent threads and otherwise become embedded in the root diameter of the bolt in locked, frictional fastening engagement therewith in applied mounted position. In the present example, such tongues are shown as extending out of the plane of the base in substantial ogee formation and provided with notched extremities forming substantial biting jaws designed to cut uniformly into the bolt shank and adjacent thread surfaces thereon in positive locking relation therewith in the most effective manner, but it is to be understood that the present invention in no manner or form is limited to the specific construction shown of the thread engaging means 15, 16, but rather, comprehends also, various related forms of tongues or equivalent thread engaging elements.

As best seen in Fig. 2, said tongues 15, 16 are preferably provided with arcuate or rounded extremities 17, 18, corresponding substantially to the root diameter of the bolt shank 1 to engage around the major portion of its periphery in providing for the most effective uniform threaded engagement therewith. Said extremities, otherwise, are spaced in normal untensioned relation a distance somewhat less than the root diameter of the bolt. Thus, as shown in Fig. 3, the spacing of the tongue extremities 17, 18 is designated a while the root diameter of the bolt shank is substantially indicated at b, and accordingly it will be understood that when the bolt is threadedly engaged with said tongues, considerable strain is set up therein to cause said extremities 17, 18, to bind against the bolt shank between adjacent thread surfaces in providing the desired locking action.

From the foregoing, it will be understood that the spring locking fastener 10 is attached to the bracket 9 substantially as shown in Fig. 3 with the extremities 17, 18, of said tongues concentrically arranged with respect to the threaded bolt passage 6 in said bracket. In this relation, the flanges 12, 13, embrace the bracket under tension to maintain the base 11 of the fastening device substantially flat against the adjacent surface of said bracket in the manner shown in Fig. 3.

The bolt is freely threaded into the threaded bolt passage 6 and as the leading thread thereof engages the tongue extremities 17, 18, a pronounced binding action of said tongue extremities with the root diameter of the bolt takes place, inasmuch as the distance a between said extremities is somewhat less than the root diameter b of the bolt. Thus, as the bolt is advanced axially to a position such as shown in Fig. 4, the extremities 17, 18 of said tongues are forced to spread apart to fully admit the bolt. Said tongues are thereby placed under a pronounced strain such that the extremities thereof cut into the root diameter of the bolt shank between adjacent thread surfaces to provide a biting, frictional locking engagement therewith under continuous spring tension. Such spring tension is provided for not only by the inherent resiliency of the tongues 15, 16, but also by the resiliency of the base 11 of the fastening device, which under such strain taking place in the tongues in threadedly engaging the bolt, has a tendency to become slightly bowed under tension substantially as illustrated in Fig. 4. In this relation, the base 11 of the fastening device, of course, attempts to assume its initially flat condition and thereby exerts a continuous spring force on the tongues to urge the extremities 17, 18 thereof inwardly toward each other in biting, frictional locking engagement with the bolt as aforesaid, to lock the bolt against accidental turning and unintended rotation resulting from any vibration and jarring effects.

Additionally, it will be understood that the extremities of the tongues 17, 18, threadedly engage the bolt threads at points which may be referred to as out of phase with the threads in the bolt passage 6 and this of course adds to the effectiveness of the locking action supplied by the fastening device in that the tongues when tensioned, naturally exert a certain amount of axial pull on the bolt to cause a binding of the thread surfaces thereof engaged with those in said bolt passage 6 provided in the bracket 9. However, even though the bolt is thus lockingly retained by the tongues of the fastening device under the various spring forces set up therein when tensioned in operative fastening position as shown in Figs. 1 and 4, said bolt is capable of fine, minute movements by means of a tool applied to either of the recesses 4, 5, to turn the same for adjustment purposes and thereby vary the spaced relation of the parts A, B, connected thereby in the installation shown in Fig. 1, for example.

By way of further illustration, it will be readily appreciated that the foregoing arrangement of the spring locking fastener for securing cooperating parts in adjustable spaced relation is particularly adapted for use in providing a simple, inexpensive, easily and quickly applied means for adjustably mounting the reflectors in various forms of present day automobile headlight arrangements. In another use, the fastening arrangement of the present invention has a most important and advantageous application in various electrical coil structures, the cores of which necessarily must be positively locked in the assembled relation thereof but, of course, capable of fine, minute adjustments as may be necessary or desirable.

Fig. 5 shows a further embodiment of the invention and illustrates the general organization of a carburetor control unit, for example, comprising a variable stop device provided by a bolt having a locked adjustable mounting in accordance with the present disclosure. Such a unit may comprise a control link 20, pivotally mounted as at 21 on the supporting structure 22 and connected at one end to an actuating lever 23. A coil spring 24 secured to a bracket 25 and the link 20, maintains said link 20 in normal position as limited by a stop provided by the end of the shank of a bolt or screw 26 adjustably mounted in the assembly by the spring locking fastener 10 of the present invention. Said fastener 10 is substantially similar in structure, operation and use to that described with reference to Figs. 1 to 4 inclusive and, as shown, is attached in a similar manner to a bracket 27 on the supporting structure 22. Said bracket is provided with a threaded bolt passage 28 into which the adjustable stop bolt 26 is threaded to the point at which the leading end thereof limits the motion of said pivoted control link 20, as desired, with the spring locking fastener 10 providing the adjustable spring locking action therefor, as aforesaid.

Figs. 6 and 7 illustrate another embodiment of the invention in which a spring locking fastener 10, of the general character described, is employed as a locking device for a coupled nut and bolt securing any two or more parts in an installation. As shown in Fig. 7, the clamping nut 30 cooperates with the bolt shank 31 to secure the parts P, P' in the usual manner and said nut is provided with suitable grooves or slots 31, 32 on a pair of its opposing side surfaces. These slots receive the inturned flanges 12, 13, of the spring nut locking device 10 in which relation the base 11 thereof is seated on the top surface of the nut with the extremities of the tongues 15, 16, concentrically arranged with respect to the threaded bolt passage therein.

As best seen in Fig. 6, the tongues 15, 16, may be notched in a manner to provide substantially V-shaped extremities 17a, 18a, presenting a generally diamond-shaped opening therebetween. Accordingly, the effective points of contact of said extremities with the bolt shank are substantially as indicated by the arrows with the distance between each pair of diagonally opposing arrows being represented by the crossed dotted lines in Fig. 6. It will be understood that such distances between said effective points of contact are somewhat less than the root diameter of the bolt shank when the tongues are untensioned in the attached position of the spring locking device on the nut 30 prior to the time the bolt shank 31 is threaded therein.

Said bolt shank is freely threaded into the nut and as the leading thread thereof engages the V-shaped extremities 17a, 18a, a pronounced binding action takes place between the root diameter of the bolt and said effective points of contact of the tongue extremities. As stated, these points of contact are indicated by the arrows in Fig. 6, and since the distance between diagonally opposing points of contact is somewhat less than the root diameter of the bolt in the untensioned relation of the tongues, said tongues are forced to spread apart to admit the bolt as it is advanced axially such that the V-shaped extremities thereof cut into the root diameter of the bolt between adjacent thread surfaces to provide a biting, frictional locking engagement therewith under continuous spring tension, substantially in the manner described with reference to the form of the invention shown in Figs. 1 to 4 inclusive. Such spring tension is provided for not only by the inherent resiliency of the tongues 15, 16, but also by the resiliency of the base 11 of the fastening device which, under the strain set up in the tongues in threadedly engaging the bolt, has a tendency to become slightly bowed under tension substantially as illustrated in Fig. 7. In this relation, the base 11 of the fastening device, of course, attempts to assume its initially flat condition and thereby exerts a continuous spring force on the tongues to urge the extremities 17a, 18a, thereof inwardly toward each other in biting, frictional locking engagement with the bolt, as aforesaid, to lock the nut 30 in tightened position with the bolt shank 31 against possible loosening from vibration and jarring effects.

And while the invention has been described in detail with specific examples, such examples are intended as illustrations only, since it will be apparent to those skilled in the art that other modifications in the construction, arrangement and general combination of elements thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In an assembly comprising a threaded bolt or screw adapted to be threadedly engaged in a threaded opening in a substantial nut element, spring locking means associated with said nut element comprising a sheet metal fastener provided with resilient preformed thread engaging means, said thread engaging means corresponding substantially to the helix of the bolt thread and being normally out of phase with the threads on said bolt fastener, said sheet metal fastener being nonrotatably attached to said nut element, whereby upon threading the bolt in said threaded opening in the nut element into threaded engagement with said thread engaging means of the sheet metal fastener, said thread engaging means have a pronounced binding action with the threads of said bolt to prevent relative rotation thereof with respect to said nut element.

2. In an assembly comprising a threaded bolt or screw adapted to be threadedly engaged in a threaded opening in a substantial nut element, spring locking means associated with said nut element comprising a sheet metal fastener provided with preformed thread engaging means, said thread engaging means corresponding substantially to the helix of the bolt thread and presenting an opening normally of a size smaller than the threaded opening in said nut element and the root diameter of the bolt fastener adapted to be threaded therein, means for nonrotatably attaching the sheet metal fastener to said nut element with said thread engaging means thereof out of phase with the thread of said nut element, whereby upon threading the bolt in said threaded opening in the nut element into threaded engagement with said thread engaging means of the sheet metal fastener, said thread engaging means forcibly engage the bolt thread engaging means forcibly engage the bolt in a binding action preventing relative rotation of said bolt with respect to said nut element, said thread engaging means and bolt having relative rotative movement in such threaded engagement whereby said bolt may be turned under tool force for axial adjustment purposes.

3. In an assembly comprising a threaded bolt or screw adapted to be threadedly engaged in a threaded opening in a substantial nut element, spring locking means associated with said nut element comprising a sheet metal fastener provided with preformed thread engaging means, said thread engaging means corresponding substantially to the helix of the bolt thread and presenting an opening normally of a size smaller than the threaded opening in said nut element and the root diameter of the bolt fastener adapted to be threaded therein, said fastener being nonrotatably attached to said nut element with said thread engaging means concentrically arranged with respect to the threaded opening therein but out of phase with the threads of said bolt, whereby upon threading the bolt in said threaded opening in the nut element into threaded engagement with said thread engaging means of the sheet metal fastener, said thread engaging means forcibly engage the bolt in a binding action preventing relative rotation of said bolt with respect to said nut element.

4. In an assembly comprising a threaded bolt or screw adapted to be threadedly engaged in a threaded opening in a substantial nut element, spring locking means associated with said nut element comprising a sheet metal fastener provided with preformed thread engaging means normally out of phase with the threads of said bolt, said thread engaging means presenting an opening normally of a size smaller than the threaded opening in said nut element and the root diameter of the bolt fastener adapted to be threaded therein, means for nonrotatably attaching the sheet metal fastener to said nut element with said thread engaging means thereof concentrically arranged with respect to the threaded opening in said nut element but out of phase with the threads of said bolt, whereby upon threading the bolt in said threaded opening in the nut element into threaded engagement with said thread engaging means of the sheet metal fastener, said thread engaging means forcibly engage the bolt in a binding action preventing relative rotation of said bolt with respect to said nut element, said thread engaging means and bolt having relative rotative movement in such threaded engagement whereby said bolt may be turned under tool force for axial adjustment purposes.

5. In an assembly comprising a threaded bolt or screw adapted to be threadedly engaged in a threaded opening in a substantial nut element, spring locking means associated with said nut element comprising a sheet metal fastener having a base provided with integral preformed thread engaging means in the form of cooperating substantial tongues extending out of the plane thereof, said tongues having extremities corresponding substantially to the helix of the bolt thread and presenting an opening normally of a size smaller than the threaded opening in said nut element and the root diameter of the bolt adapted to be threaded therein, means for nonrotatably attaching said sheet metal fastener to said nut element with the extremities of said tongues concentrically arranged with respect to the threaded opening therein and spaced from the adjacent surface of said nut element in out of phase relation to the thread of said nut element, whereby upon threading the bolt in said threaded opening in the nut element into threaded engagement with said tongues of the sheet metal fastener, said tongues forcibly engage the threads of the bolt and simultaneously exert an axial tension thereon preventing relative rotation thereof with respect to said nut element.

6. In an assembly comprising a threaded bolt or screw adapted to be threadedly engaged in a threaded opening in a substantial nut element, spring locking means associated with said nut element comprising a sheet metal fastener provided with integral preformed thread engaging means in the form of cooperating substantial tongues extending out of the plane of the base thereof, said tongues presenting an opening normally of a size smaller than the threaded opening in said nut element and the root diameter of the bolt adapted to be threaded therein, said sheet metal fastener having means extending from its base for nonrotatably attaching the same to said nut element with the extremities of said tongues thereof concentrically arranged with respect to the threaded opening in said nut element but out of phase with the threads of said bolt, whereby upon threading the bolt in said threaded opening in the nut element into threaded engagement with said tongues of the sheet metal fastener, said tongues forcibly engage the threads of the bolt in a binding action preventing relative rotation thereof with respect to said nut element, said tongues and bolt having relative rotative movement in such threaded engagement whereby said bolt may be turned under tool force for axial adjustment purposes.

7. In an assembly comprising a threaded bolt or screw adapted to be threadedly engaged in a threaded opening in a substantial nut element, spring locking means associated with said nut element comprising a sheet metal fastener having a base provided with integral preformed thread engaging means in the form of cooperating substantial tongues pressed therefrom to extend out of the plane thereof, said tongues presenting an opening normally of a size smaller than the threaded opening in said nut element and the root diameter of the bolt adapted to be threaded therein, said sheet metal fastener having substantial flanges extending from its base for nonrotatably attaching the same to said nut element with the extremities of said tongues concentrically arranged with respect to the threaded opening therein and spaced from the adjacent surface of said nut element in out of phase relation with the threads of said bolt, whereby upon threading the bolt in said threaded opening in the nut element into threaded engagement with said tongues of the sheet metal fastener, said tongues forcibly engage the threads of the bolt in a binding action and simultaneously exert an axial tension thereon preventing relative rotation thereof with respect to said nut element, said tongues and bolt having relative rotative movement in such threaded engagement whereby said bolt may be turned under tool force for axial adjustment purposes.

GEORGE A. TINNERMAN.